Feb. 7, 1950 C. SAURER 2,496,679
FAUCET
Filed March 13, 1946
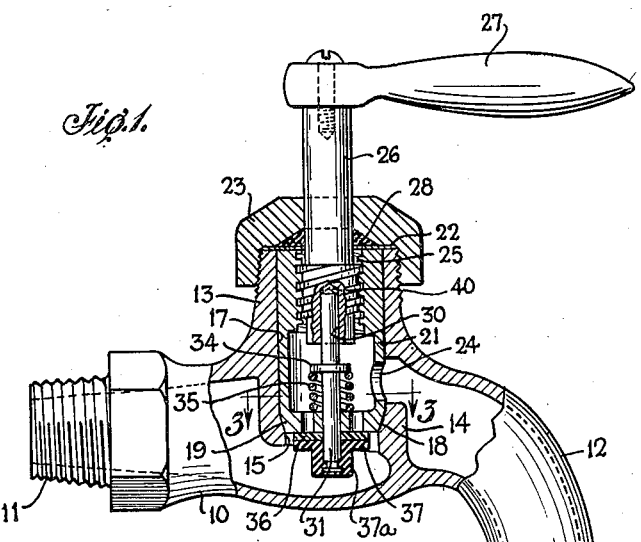
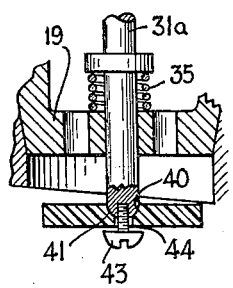
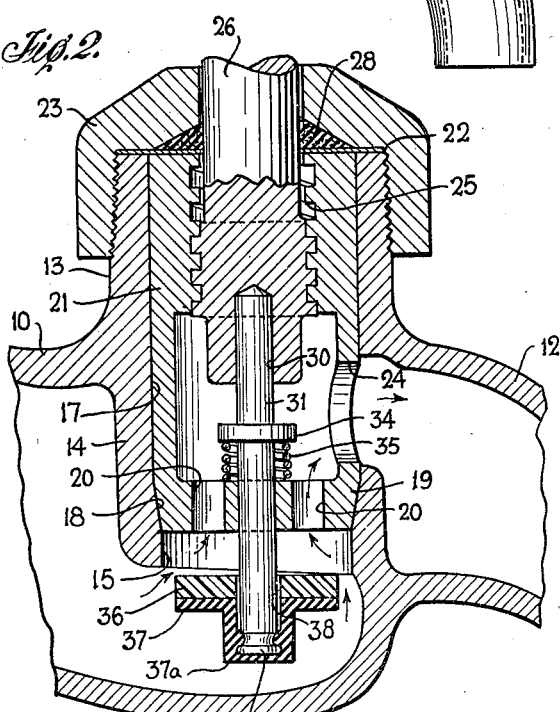
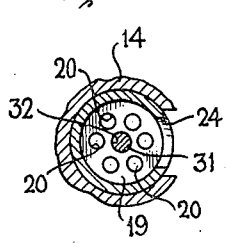
INVENTOR
CURT SAURER
BY
ATTORNEYS Patented Feb. 7, 1950

2,496,679

UNITED STATES PATENT OFFICE 2,496,679

FAUCET

Curt Saurer, Detroit, Mich.

Application March 13, 1946, Serial No. 653,974

2 Claims. (Cl. 251—160)

This invention relates to faucets, and more especially it relates to faucets of the type such as commonly are employed for household and similar uses.

Faucets of the character mentioned usually employ a manually rotatable threaded stem having a valve-gasket of stiff rubber or other composition at the bottom thereof adapted to cooperate with a raised valve seat, the latter circumscribing a fluid passage, and the valve controlling the passage of fluid therethrough. In such faucets the rotation of the threaded stem moves the valve gasket axially from and toward the valve seat, the gasket usually rotating with the stem. The stem forces the valve gasket onto the seat to close the valve and shut off the fluid passage, with the result that the gasket is subjected to localized friction and pressure from the valve seat, and eventually disintegrates and fails.

The foregoing and other disadvantages and disabilities of prior construction are overcome in the present invention by improved valve means whereof fluid pressure alone is utilized to hold the valve in closed position, and manually operated means is employed for opening the valve in opposition to said fluid pressure.

The chief objects of the invention are to provide a faucet having an improved valve mechanism therein; to provide a valve mechanism of the character mentioned that will operate on a different principle from conventional valves of a similar nature; to provide valve mechanism having longer life; to provide for ready accessibility and easy mounting and removal of the valve mechanism; and to obviate friction of the valve against the valve seat. Other objects will be manifest as the description proceeds.

Of the accompanying drawing:

Fig. 1 is a side elevation of a faucet embodying the invention, a portion thereof being broken away to show the operative elements of the invention in vertical diametric section, as they appear when the valve of the faucet is in closed position;

Fig. 2 is a fragmentary sectional view, on a larger scale, of the essential elements of Fig. 1 showing the valve of the faucet in open position;

Fig. 3 is a section on the line 3—3 of Fig. 1 showing the valve seat of the faucet-valve in plan; and Fig. 4 is a fragmentary sectional detail of a modified valve structure that may be employed in the faucet.

Referring to the drawing there is shown a faucet housing or casing 10 that exteriorly is of conventional appearance, said casing comprising the usual threaded nipple portion 11 at the inlet end thereof, a downwardly curved discharge spout 12, and a tubular upwardly extending formation 13 intermediate the opposite ends of the casing. Interiorly of the casing is formed an integral partition or wall 14 that separates the inlet of the faucet from the outlet thereof, said partition being formed with a circular flow opening 15 disposed on a vertical axis that is substantially coincident with the axis of formation 13.

The formation 13 is formed with an axial bore 17 that extends from the top thereof downwardly into the partition 14, the lower end of said bore being formed with a taper 18 that terminates at the flow opening 15 with which it is concentric. Positioned upon the taper 18 of bore 17 is a metallic disc-like valve seat 19, which seat is formed with a series of apertures 20, 20 therein to admit the passage of fluid therethrough when the valve is open. The valve seat 19 is peripherally tapered substantially complemental to the taper of region 18 of bore 17, the taper of said valve seat preferably being at a slightly smaller angle (about 1°) so that the valve seat may be wedged into place by downwardly directed pressure applied thereto. For applying such pressure to the valve seat 19, the latter preferably is formed as an integral part of a sleeve 21, at the bottom thereof, which sleeve has a close fit within the bore 17.

The upper end of the sleeve 21 is substantially flush with the top of the formation 13. A washer 22 is positioned over the upper end of said sleeve and formation 13, and retained in place by a cap-nut 23 that is threaded onto the upper end portion of said formation 13. The lower end portion of the sleeve 21 is formed with one or more openings or ports, such as the port 24, that enables fluid that passes through the valve seat by way of apertures 20 to have access to the discharge spout 12.

The upper end portion of sleeve 21 is interiorly formed with double female threads 25 of relatively steep pitch in which the lower end portion of the spindle 26 of the faucet is threadedly received. Said spindle 26 extends upwardly through a suitable opening in the cap nut 23 and has its upper end provided with the usual operating handle or lever 27. A packing gasket 28 is clamped about the spindle, between the nut 23 and washer 22, to prevent the leakage of fluid along the spindle. The lower end portion of the spindle 26 is formed with an axial bore 30 that extends upwardly an exact distance from the lower end of the spindle. Slidably received within the bore 30 is the upper end portion of a pin or stem 31 that extends through an axial aperture 32 in the valve seat 19 and has its lower end peripherally grooved as shown to provide a terminal button-like formation 33. The stem 31 has a sliding fit in the aperture 32, the arrangement being such that the spindle 26 and valve seat 19 constitute journals for said stem 31.

Formed on said stem, intermediate the ends thereof, is an integral flange or collar 34, which flange is located above the valve seat 19 in the assembled structure, and a light compression spring 35 is mounted upon the stem between the flange 34 and the top face of valve seat 19.

Mounted upon the lower end of stem 31, below the valve seat, is a valve member adapted for axial movement within the flow opening 15 so as to move into and out of operative engagement with said valve seat, to cover or uncover the apertures 20 therein. Said valve member is a laminated composite structure consisting of a disc 36 composed of relatively rigid material, and a disc 37 of resilient elastic material bonded to the bottom face thereof, said disc 37 being formed with a downwardly extending axial boss 37a. The disc 36 may be composed of relatively soft metal, such as brass or the like, or it may be composed of a suitable molded thermo-setting plastic composition. Of the latter, "Stenite No. 1" a specially compounded composition of asbestos fibre and/or other pigments bonded together with a modified phenolic-type resin, which is the product of the Brunswick Laboratory of Troy, New York, has been found to give satisfactory performance. The disc 37 is composed of tough vulcanized rubber composition, either natural or synthetic, and is vulcanized to the disc 36. The valve member is formed with an axial recess 38 extending from the top face of the disc 36 downwardly into the boss 37a, the bottom of said recess being shaped complemental to the button-like formation 33 on the lower end of stem 31. The recess 38 is of appreciably larger diameter than the stem 31, above the formation 33 on the bottom thereof, to enable the stem readily to be forced into said recess whereby the valve member is securely retained on the stem by interlock with the button-like formation thereon. The arrangement also enables the disc 36 to tilt slightly relatively of the stem 31, and thus to be able to bear flush against the valve seat 19 at all times when the valve is closed.

In operation, opening of the faucet is effected by turning the handle 27 in the usual manner to thread the spindle 26 downwardly in the sleeve 21, whereby the stem 31 is forced downwardly and the valve-disc 36 moved away from the valve seat 19 to open the apertures 20 of the latter to the fluid under pressure in the flow opening 15. The fluid may then flow through said apertures and through the port 24 to the discharge spout 12 of the faucet. The operation is reversed to close the faucet, at which time the spindle 26 rises, and the pressure of the fluid below the valve member forces the latter upwardly until it bears flush against the valve seat 19 to obstruct the apertures 20 therein, and shut off the flow of fluid to the spout 12. The spring 35 initiates and assists the lifting of the valve member and stem 31 if the pressure of the fluid is low. Rising movement of the valve member and its stem 31 ceases as soon as the valve is seated, but the spindle 26 may continue to rise somewhat, relatively of the stem 31, as indicated by the space 40 shown between the top of said stem and the upper end of spindle bore 30 in Fig. 1. The arrangement is such that the valve member is held in closed position upon the valve seat substantially solely by pressure of the fluid that is on the faucet. The spindle 26 turns readily relatively of the stem 31 so that there is no sliding friction of the valve disc 36 upon the valve seat 19, with the result that wear upon these parts is avoided.

From the foregoing, it will be apparent that the invention is simple in construction, efficient in operation, and will have low upkeep expense. Should repair or inspection be necessary, the cap-nut 23 may be unthreaded and the entire operative mechanism of the faucet removed as a unit, the flange 34 on the stem 31 preventing the latter from slipping out through its lower journal-aperture 32. The housing or casing 10 needs but little machinery to adapt it to the invention, it being necessary only to ream the bore 17 and its tapered portion 18 accurately to size.

Although the faucet shown has an inlet nipple at one end thereof, the invention is equally well adapted to faucets having the inlet at the bottom thereof. Furthermore, it is not essential that the sleeve 21 and the valve seat 19 be a one-piece structure, since they may be two individual elements without substantial sacrifice of the advantageous features of the invention.

In the modified valve construction shown in Fig. 4, the stem 31a is formed with a hemispherical lower end 40 that is engageable in a similarly shaped axial socket 41 in a valve disc 42. The latter is loosely secured to the said stem by a screw 43 that extends through an axial bore 44 of somewhat larger size formed in the valve element, said screw being threaded axially into the end of the stem. The arrangement enables substantially universal movement of the valve member relatively of the stem, so that said valve member will fit flush against the valve seat 19.

Other modifications may be resorted to without departing from the spirit of the invention or the scope thereof as defined by the appended claims.

What is claimed is:

1. A faucet of the character described comprising a valve seat in the flow passage of the faucet, a disc-like valve structure arranged for axial movement from and toward said valve seat, and comprising a body of resilient material having a facing of rigid material on the side thereof confronting the valve seat, said structure having an axial recess extending through the rigid material and into the resilient material, the stem being received in said recess and connected to the resilient material at the bottom of the recess, a local region of the recess being of larger diameter than the stem to enable limited universal movement of the valve structure relatively to the stem.

2. A faucet as in claim 1, said stem having an annular recess, and the axial recess in the resilient material having an annular bead received in said annular recess.

CURT SAURER.

REFERENCES CITED

The following references are of record in the file of this patent:

UNITED STATES PATENTS

| Number | Name | Date |
|---|---|---|
| 306,503 | Maybury | Oct. 14, 1884 |
| 1,494,543 | Hazeltine | May 20, 1924 |
| 1,805,158 | Bacon | May 12, 1931 |
| 1,875,574 | Duncan | Sept. 6, 1932 |
| 2,159,452 | Samaras | May 23, 1939 |
| 2,216,292 | Evleth | Oct. 1, 1940 |
| 2,254,308 | Nicholas | Sept. 2, 1941 |
| 2,315,948 | Esnard | Apr. 6, 1943 |

FOREIGN PATENTS

| Number | Country | Date |
|---|---|---|
| 451,138 | France | of 1913 |